(12) United States Patent
Yoo et al.

(10) Patent No.: US 8,565,834 B2
(45) Date of Patent: Oct. 22, 2013

(54) PORTABLE COMMUNICATION DEVICE

(75) Inventors: Jae-Joon Yoo, Seoul (KR); Jung-Nam Moon, Incheon (KR); Hong-Moon Chun, Gyeonggi-do (KR); Sue-Kyoung Chin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/212,299

(22) Filed: Aug. 18, 2011

(65) Prior Publication Data

US 2012/0052919 A1    Mar. 1, 2012

(30) Foreign Application Priority Data

Aug. 30, 2010   (KR) .................. 10-2010-0083805

(51) Int. Cl.
*H04B 1/38* (2006.01)
*H04M 1/00* (2006.01)

(52) U.S. Cl.
USPC ....................................... 455/566; 455/575.1

(58) Field of Classification Search
USPC .......................... 455/566, 575.1–575.4, 567
See application file for complete search history.

(56) References Cited

U.S. PATENT DOCUMENTS

| 2007/0076861 A1* | 4/2007 | Ju ............................ 379/433.01 |
| 2008/0125191 A1* | 5/2008 | Nordenskjold ............ 455/575.1 |
| 2011/0077053 A1* | 3/2011 | Lee et al. ...................... 455/566 |

* cited by examiner

*Primary Examiner* — Michael Faragalla
(74) *Attorney, Agent, or Firm* — Cha & Reiter, LLC

(57) ABSTRACT

A portable communication device comprises a cover part in which the existing front cover part and the battery cover part are integrally formed with each other. The portable communication device includes a battery pack; a window; a keypad; a printed circuit board with an LCD module; an LCD bracket for attaching the window; and a cover part whose front side is open and which forms a mounting space toward its inside, wherein the battery pack, the printed circuit board coupled with the keypad, the LCD bracket and the window are provided within the mounting space.

14 Claims, 8 Drawing Sheets

PORTABLE COMMUNICATION DEVICE

CLAIM OF PRIORITY

This application claims the priority under 35 U.S.C. §119 (a) of an application entitled "Portable Communication Device" filed in the Korean Intellectual Property Office on Aug. 30, 2010 and assigned Serial No. 10-2010-0083805, the contents of which are hereby incorporated by reference.

BACKGROUND OF THE INVENTION

1. Field of the Invention

The present invention relates to a portable communication device having a cover part in which the existing front cover part and the battery cover part are integrally formed with each other.

2. Description of the Related Art

In general, a "portable communication devices" enables a wireless communication with a user is roaming. Such a portable communication device includes a hand held product (HHP), a CT-2, a cellular phone, a digital phone, a personal communications service (PCS) phone, a personal digital assistant (PDA) or the like, which may be classified into various types depending on appearances thereof. For example, the portable communication device can be divided into a bar-type, a flip-type, a folder-type, or a slide-type wireless terminal according to its appearance. These conventional portable communication devices typically provided with an antenna device, a data input/output device, and a data transmitting/receiving device. Among these devices, a data input/output device equipped with a keypad, which allows an input of data by manipulating pushing operations with the user's fingers, has come into wide spread use.

Referring to FIGS. 1 and 2, the conventional bar-type portable communication device 1 typically includes a front cover part 2, a rear cover part 3, a keypad 4, a main window 5 and a battery cover part 6.

A printed circuit board (PCB) 7 provided with a liquid crystal display (LCD) module (not shown) is disposed between the front cover part 2 and the rear cover part 3.

As shown in FIG. 2, the keypad 4 is secured to the front cover part 2 through an engaging part 2a formed at the front cover part 2. In this state, the front cover part 2 is joined to the rear cover part 3. The battery cover part 6 is coupled to the rear surface of the rear cover part 3, while the main window 5 is attached to the front surface of the front cover part 2.

However, in the conventional bar-type portable communication device, both the main window 5 and the keypad 4 must be assembled to the front cover part 2. In this state, the front cover part 2 should be joined to the rear cover part 3 and the battery cover part 6 must be coupled to the rear cover part 3. This type of assembly has drawbacks in that it increases the number of components which in turn increases manufacturing costs of a product. In addition, the main window 5 and the keypad 4 must be assembled to the front cover part 2, which makes the assembling process difficult and impose limitations in improving the outer design thereof.

Therefore, there has been a need to develop a cover part in which the existing front cover part and the battery cover part are integrally formed with each other in order to lower the manufacturing costs by reducing the number of components while improving the outer design and appearance of the device.

SUMMARY OF THE INVENTION

Accordingly, the present invention has been made to solve the above-mentioned problems occurring in the prior art and provides additional advantages, by providing a portable communication device having a cover part in which the existing front cover part and the battery cover part are integrally formed with each other, thus omitting the components like the front cover part and battery cover part, and thereby lowering the manufacturing costs of a product and improving the outer design of the product.

Another aspect of the present invention provides a portable communication device in which the existing front cover part and the battery cover part are integrally formed with each other, which can omit the components like the front cover part and battery cover part, thereby improving the assembly process.

Still another aspect of the present invention provides a portable communication device which can protect the printed circuit board from outer environment, by constructing a coupling part in the keypad to enclose the printed circuit board to absorb impacts through the keypad of the type having a rubber material.

Still another aspect of the present invention provides a portable communication device capable of lowering its the manufacturing cost and further improving the assembly process of the product by integrally forming a window at a liquid crystal display (LCD) bracket through a double injection molding. As a result, there is no need to use a double-sided tape to attach the window as well as assembling of the window.

In accordance with an aspect of the present invention, there is provided a portable communication device including: a battery pack; a window; a keypad; a printed circuit board with an LCD module; an LCD bracket for attaching the window; and a cover part whose front side is open and which forms a mounting space toward its inside, wherein the battery pack, the printed circuit board coupled with the keypad, the LCD bracket and the window are provided within the mounting space.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
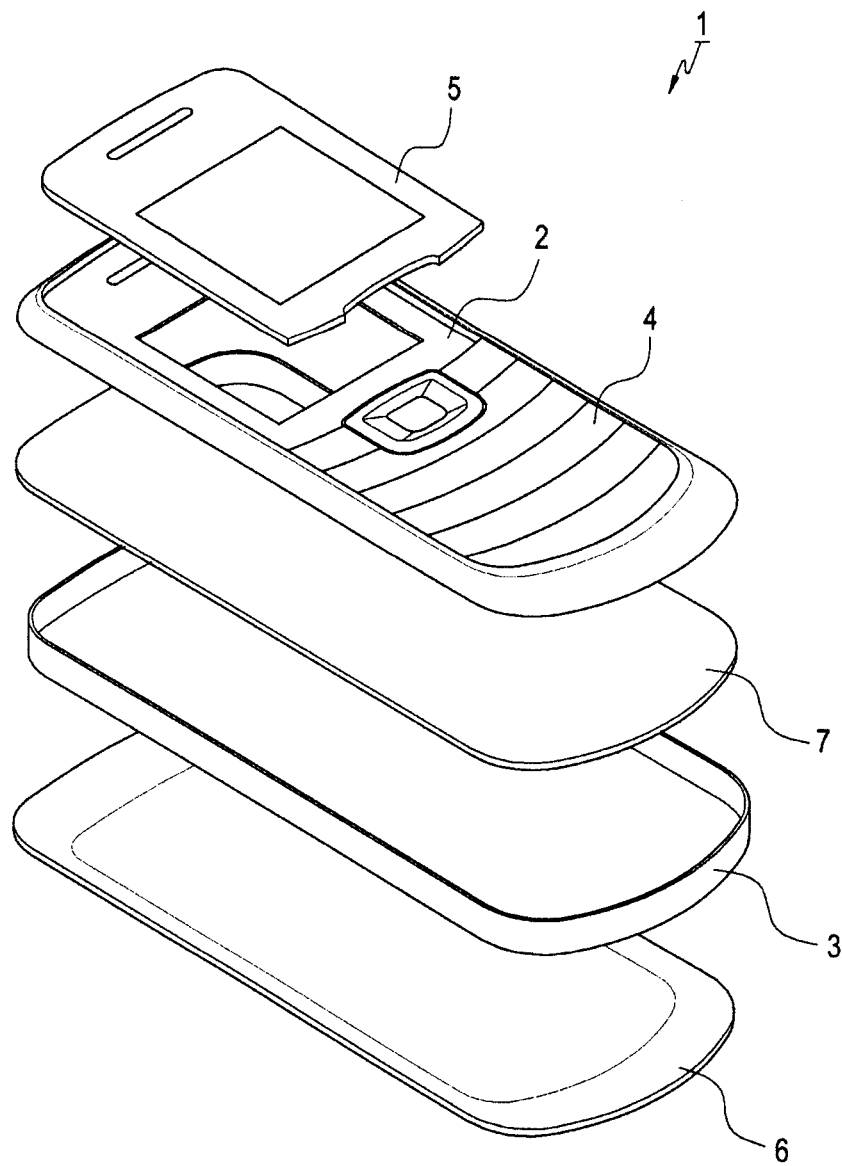
FIG. 1 is an exploded perspective view illustrating the construction of the conventional bar-type portable communication device.
Figure 2:
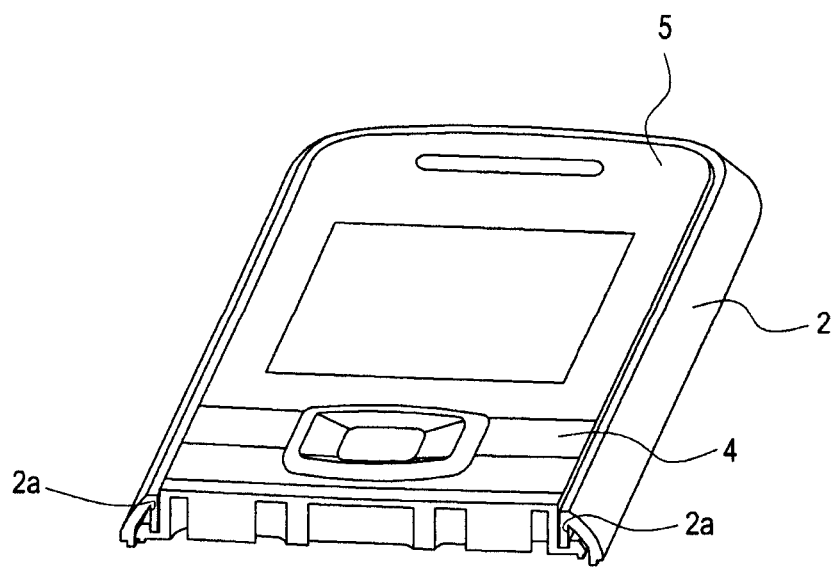
FIG. 2 is a perspective view illustrating the coupled state of the keypad of the conventional bar-type portable communication device.

Hereinafter, embodiments of the present invention will be described with reference to the accompanying drawings. In the following description, various specific definitions found in the following description are provided only to help general understanding of the present invention, and it is apparent to those skilled in the art that the present invention can be implemented without such definitions.

Referring to FIGS. 3 to 8, a portable communication device 10 includes a battery pack 11, a window 12, a keypad 13, a printed circuit board (PCB: 14) having an LCD module 14*a*, an LCD bracket 15, and a cover part 16. The LCD bracket 15 is provided at the PCB 14 so as to attach the window 12 thereto using double-sided tape (not shown). In addition to the double-sided tape, any other attaching means such as silicone, or adhesives can be employed.

Figure 3:
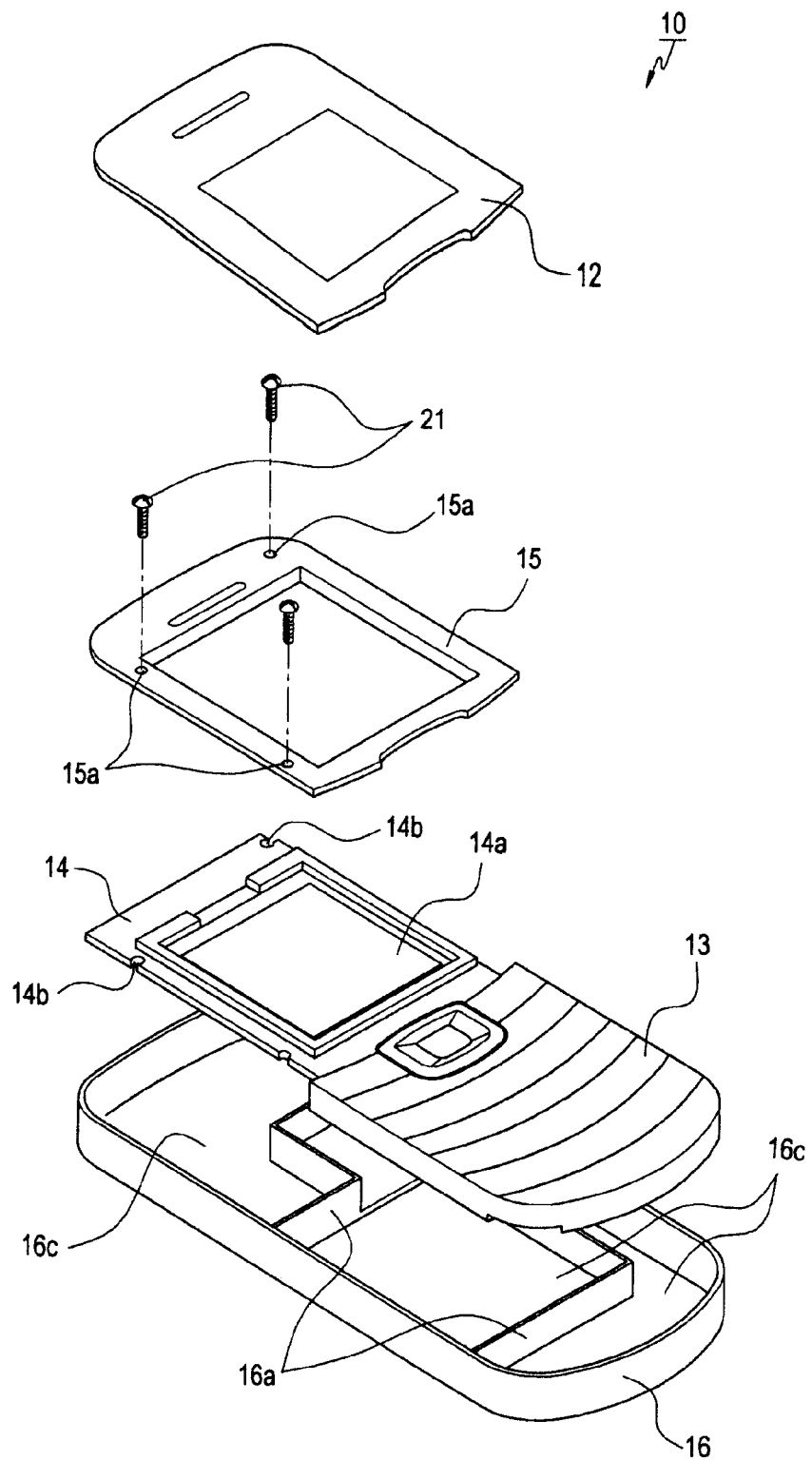
FIG. 3 is an exploded perspective view illustrating the construction of the portable communication device in accordance with a preferred embodiment of the present invention.
Figure 4:
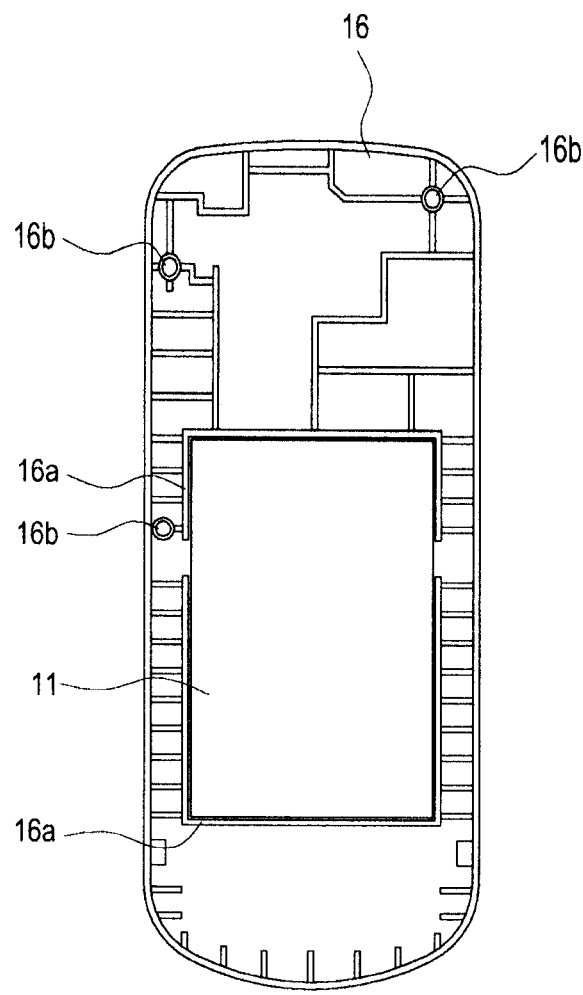
FIG. 4 is a plan view illustrating the cover part of the portable communication device in accordance with a preferred embodiment of the present invention.

As shown in FIGS. 3 and 4, the cover part 16 is open at its front side, and comparing to the prior art, the front cover part 2 and the battery cover part according the teachings of the invention are integrally formed with each other, and a mounting space 16*c* is formed inside the cover part 16. Further, the battery pack 11, the PCB 14 coupled with the keypad 13, the LCD bracket 15, and the window 12 are provided within the mounting space 16*c*.

Figure 8:
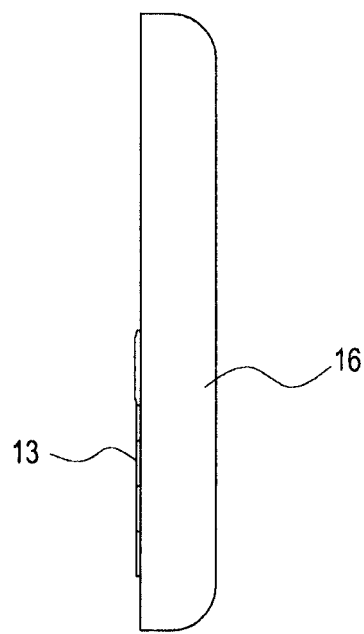
FIG. 8 is a side elevation view illustrating the coupled state of the portable communication device in accordance with a preferred embodiment of the present invention.

Referring to FIGS. 1 and 8, the front surface of the cover part 16 is constructed to expose the keypad 13 and the window 12 to the outside. To this end, the inner side of the cover part 16 is provided with a securing part 16*a* to fix the battery pack 11.

Figure 5:
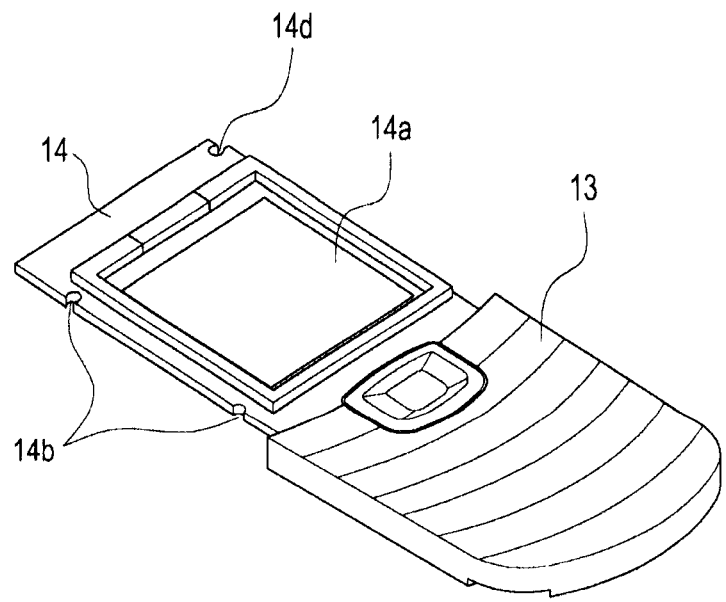
FIG. 5 is a perspective view illustrating the coupled state of the printed circuit board and the keypad of the portable communication device in accordance with a preferred embodiment of the present invention.
Figure 6:
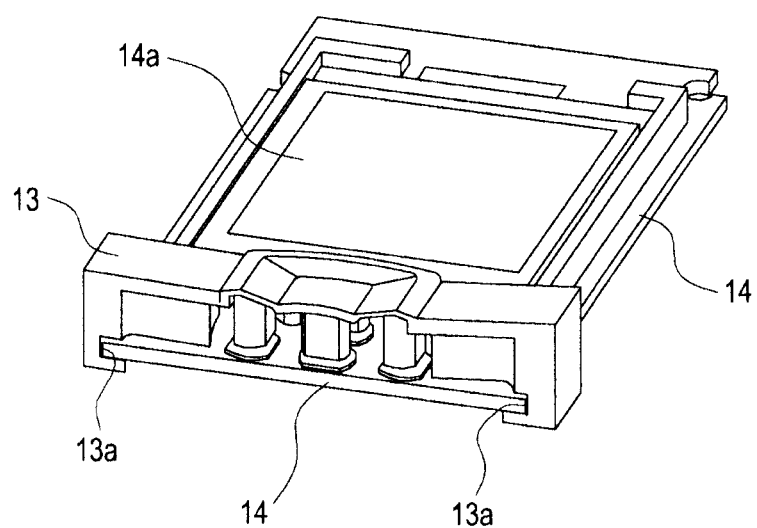
FIG. 6 is a cutaway perspective view illustrating the coupled state of the printed circuit board and the keypad of the portable communication device in accordance with a preferred embodiment of the present invention.

As shown in FIGS. 3, 5 and 6, the keypad 13 is made from a rubber material. The keypad 13 is formed with coupling parts 13*a* for enclosing and coupling the opposite edges of the PCB 14 to absorb impacts transferred to the PCB when the portable communication device 10 is dropped or abruptly shaken, thereby protecting the PCB 14 from an impact or disturbance. The coupling parts 13*a* include coupling grooves to be assembled with the opposite edges of the PCB 14.

Referring to FIGS. 3 to 6, the cover part 16 is formed with at least one screw fastening part 16*b* to be joined with the LCD bracket 15 through a screw 21. The LCD bracket 15 is provided with at least one screw hole 15*a* to receive the screw 21, while the PCB 14 is formed with at least one screw hole 14*b* to allow the screw 21 fastened with the LCD bracket 15 to be penetrated.

Figure 9:
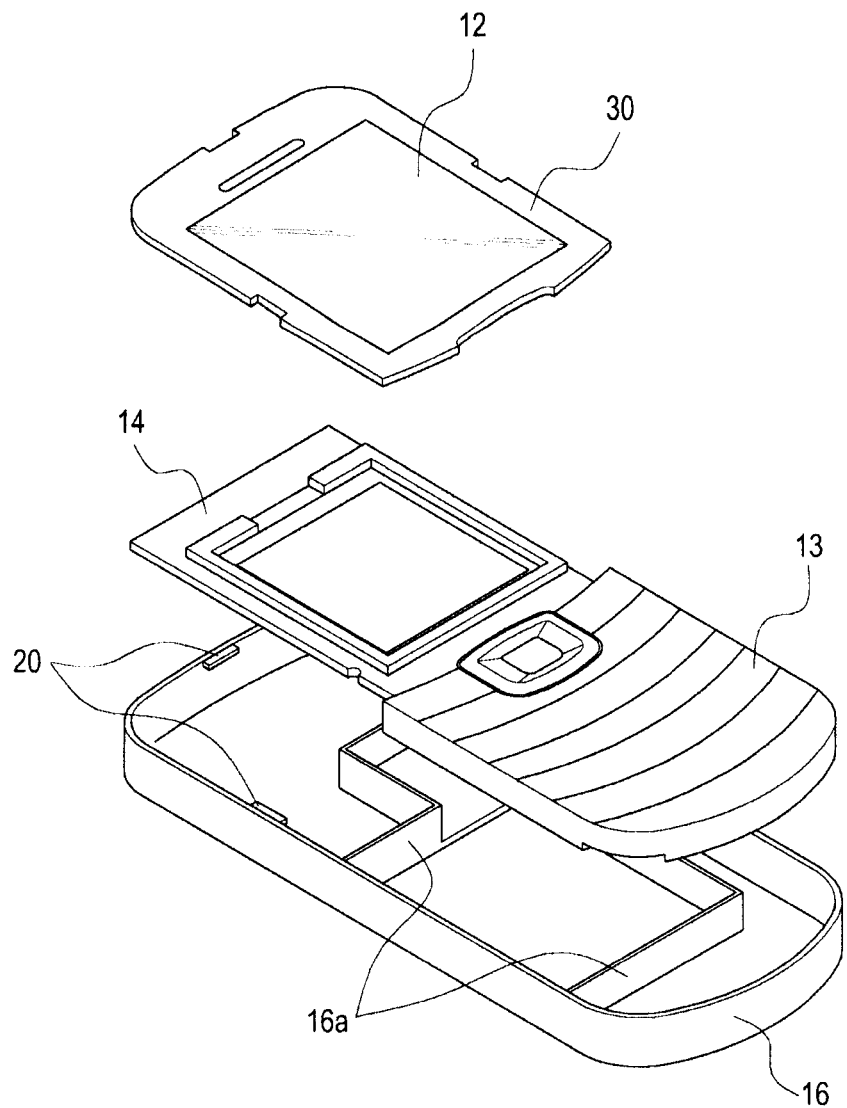
FIG. 9 is an exploded perspective view illustrating another embodiment of an LCD bracket of the portable communication device in accordance with a preferred embodiment of the present invention.
Figure 10:
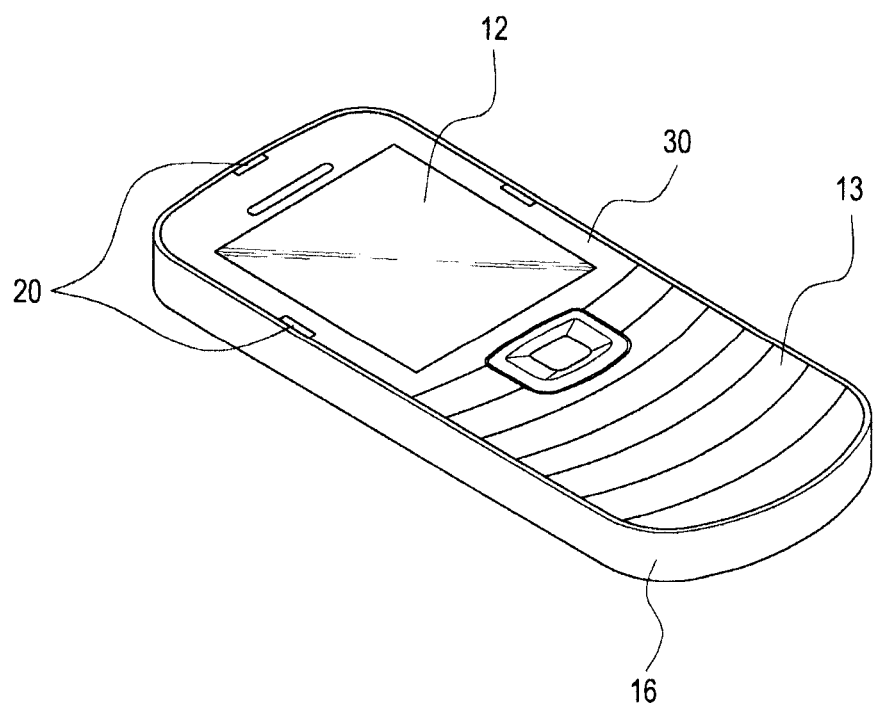
FIG. 10 is a perspective view illustrating the coupled state of another embodiment of an LCD bracket of the portable communication device in accordance with a preferred embodiment of the present invention.

Further, as shown in FIGS. 9 and 10, there is illustrated another embodiment of the LCD bracket 30. The LCD bracket 30 is integrally formed with the window 12 through a double injection molding, wherein the cover part 16 is formed with at least one engaging part 20 to be fittingly coupled with the outer side surface of the LCD bracket 30.

As described above, the cover part 16 in accordance with a preferred embodiment of the present invention represents a bar-type portable communication device 10 as an exemplary application. However, the teachings of the present invention is not necessarily limited to the bar-type wireless communication terminal, but it may be applicable to a various other types of terminals with the cover part 16, for instance, a folder-type, a slide-type, a swing-type terminal or the like.

Moreover, examples of the bar-type portable communication device 10 in accordance with a preferred embodiment of the present invention may include all of the information communication devices and multimedia devices and their application devices, such as a PMP (Portable Multimedia Player), an MP3 player, a navigation, a game center, a laptop computer, a signboard, TV, a digital broadcasting player, a PDA, a smart phone, a waterproof phone or the like, including all of the mobile communication terminals to be operated on the basis of communication protocols corresponding to a variety of communication systems.

The assembly operation of the portable communication device having the constructions as the above in accordance with a preferred embodiment of the present invention will be described in detail with reference to FIGS. 3 to 10 hereinafter.

Referring to FIGS. 3 to 8, the portable communication device 10 includes a battery pack 11, a window 12, a keypad 13, a printed circuit board (PCB: 14) having an LCD module 14*a*, an LCD bracket 15, and a cover part 16.

As shown in FIGS. 3 and 4, the battery pack 11 is secured to the securing part 16*a* formed in the cover part 16.

Then, the keypad 13 is coupled at either end of the PCB 14, enclosing the latter. The coupling parts 13*a* formed at the keypad 13 are fittingly coupled at the opposite edges of the PCB 14, respectively, as shown in FIGS. 5 and 6.

In this state, as shown in FIGS. 3 to 8, the PCB 14 is assembled within the mounting space 16*c* formed at the cover part 16. The LCD bracket 15 is then installed on the front surface of the LCD module 14*a* of the PCB 14.

Then, as shown in FIG. 3, the screws 21 are fastened with the screw holes 15*a* of the LCD bracket 15, penetrating the screw holes 14*b* formed at the PCB 14, and then secured to the screw fastening parts 16*b* formed at the cover part 16.

Figure 7:
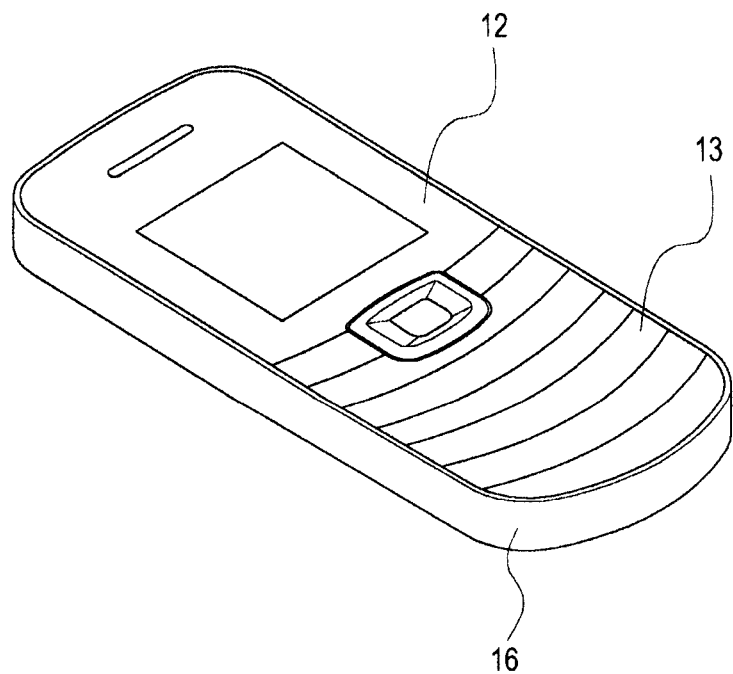
FIG. 7 is a perspective view illustrating the coupled state of the portable communication device in accordance with a preferred embodiment of the present invention.

In this state, as shown in FIGS. 3, 7 and 8, the window 12 is attached onto the front surface of the LCD bracket 15 using double-sided tape (not shown).

It should be appreciated that the present invention is constructed by assembling the battery pack 11, the printed circuit board 14 coupled with the keypad 13, the LCD bracket 15 and the window 12 to the cover part 16 whose front side is open, such that the conventional front cover part 2 and the battery cover part 6 are no longer necessary, thus reducing the number of the components which in turn reduces the manufacturing costs of the product.

Furthermore, as shown in FIGS. 9 and 10, the LCD bracket 30 in an alternate embodiment is integrally formed with the window 12 through a double injection molding. As a result, the LCD bracket 30 can be fitted and coupled with the engaging parts 20 formed at the cover part 16. It should be noted that the LCD bracket 30 is integrally formed with the window 12 which would have been attached thereto using double-sided tape, so as to improve the assembly process of the product as well as reduce the manufacturing costs of the product.

While the invention has been shown and described with reference to certain embodiments thereof, it will be understood by those skilled in the art that the portable communication device as described above is not limited to the aforementioned embodiments and the drawings, and a variety of changes in form and details of the various types of the terminal, for example a slide-type, a swing-type and a waterproof terminal, may be made therein without departing from the spirit and scope of the invention as defined by the appended claims.

What is claimed is:

1. A portable communication device comprising:
   a window;
   a printed circuit board, wherein said printed circuit board comprises an LCD module mounted at one end thereof and a key pad coupled to the LCD module and mounted at the other end thereof;
   an LCD bracket for coupling the window to the printed circuit board; and
   a cover part that is arranged at a rear-most back side of the portable communication terminal, the cover part having a frontal opening and a mounting space inside defined by sidewalls arranged around a perimeter of the back side of the cover part to define the frontal opening in which the printed circuit hoard, LCD module and keypad are received within the frontal opening of the cover part therein, and wherein a battery pack and the keypad are disposed within a first mounting space of the cover part, and the LCD module, the LCD bracket, and the window are provided within a second mounting space of the cover part such that the keypad and window are arranged within the cover part and exposed to an exterior of the portable communication device.

2. The portable communication device as recited in claim 1, wherein the inner side of the cover part is provided with a securing part to fixably couple the battery pack.

3. The portable communication device as recited in claim 1, wherein the keypad is made from a rubber material and formed with coupling parts having coupling grooves for enclosing and coupling the printed circuit board.

4. The portable communication device as recited in claim 1, wherein the cover part is provided with at least one screw fastening part to be joined with the LCD bracket through screws, wherein the LCD bracket is provided with at least one screw hole to receive the screws, and wherein the printed circuit board is formed with at least one screw hole to allow the screws to be penetrated therethrough.

5. The portable communication device as recited in claim 1, wherein the window is coupled to the LCD bracket via a double-sided tape.

6. The portable communication device as recited in claim 1, wherein the window is integrally formed with the LCD bracket through a double injection molding.

7. The portable communication device as recited in claim 1, wherein the cover part is formed with at least one engaging part to be fittingly coupled with the outer side surface of the LCD bracket.

8. A method of making a housing for a portable terminal, comprising the steps of:
   forming a printed circuit board having an LCD module mounted thereon at one end and a key pad mounted thereon at a second end;
   coupling an LCD bracket to the printed circuit board;
   coupling a window to the LCD bracket;
   forming a cover part arranged at a rear-most back side of the portable terminal defined by sidewalls arranged around a perimeter of the back side of the cover part to define a frontal opening in which the printed circuit board, LCD module and keypad are received within the frontal opening of the cover part therein, and having a mounting space inside; and
   integrally forming the printed circuit board to the cover part so that a battery pack and the key pad are disposed within a first mounting space of the cover part, and the LCD module, the LCD bracket, and the window are provided within a second mounting space of the cover part such that the keypad and window are arranged within the cover part and exposed to an exterior of the portable communication device.

9. The method as recited in claim 8, further comprising providing a securing part in the inner side of the cover part to fixably couple the battery pack.

10. The method as recited in claim 8, further comprising forming the keypad with coupling parts having coupling grooves for enclosing and coupling the printed circuit board.

11. The method as recited in claim 8, wherein the cover part is provided with at least one screw fastening part to be joined with the LCD bracket through screws, wherein the LCD bracket is provided with at least one screw hole to receive the screws, and wherein the printed circuit board is formed with at least one screw hole to allow the screws to be penetrated therethrough.

12. The method as recited in claim 8, wherein the window is coupled to the LCD bracket via a double-sided tape.

13. The method as recited in claim 8, wherein the window is integrally formed with the LCD bracket through a double injection molding.

14. The method as recited in claim 8, wherein the cover part is formed with at least one engaging part to be fittingly coupled with the outer side surface of the LCD bracket.

* * * * *

UNITED STATES PATENT AND TRADEMARK OFFICE
CERTIFICATE OF CORRECTION

| | | |
|---|---|---|
| PATENT NO. | : 8,565,834 B2 | Page 1 of 1 |
| APPLICATION NO. | : 13/212299 | |
| DATED | : October 22, 2013 | |
| INVENTOR(S) | : Jae-Joon Yoo et al. | |

It is certified that error appears in the above-identified patent and that said Letters Patent is hereby corrected as shown below:

In the Claims:
Column 5, Claim 1, Line 15 should read as follows:
--...printed circuit board, LCD...--

Signed and Sealed this
Twenty-eighth Day of January, 2014

Michelle K. Lee
*Deputy Director of the United States Patent and Trademark Office*